United States Patent
Gustavsen et al.

(10) Patent No.: US 11,445,708 B2
(45) Date of Patent: Sep. 20, 2022

(54) FLOATING MARINE PLANT FOR CONTAINING MARINE ORGANISMS

(71) Applicant: Sembcorp Marine Integrated Yard Pte. Ltd., Singapore (SG)

(72) Inventors: Hugo Gustavsen, Kleppesto (NO); Gunnar Johnson, Bergen (NO)

(73) Assignee: Sembcorb Marine Integrated Yard Pte. Ltd.

( * ) Notice: Subject to any disclaimer, the term of this patent is extended or adjusted under 35 U.S.C. 154(b) by 102 days.

(21) Appl. No.: 16/491,482

(22) PCT Filed: Mar. 23, 2018

(86) PCT No.: PCT/NO2018/050085
§ 371 (c)(1),
(2) Date: Sep. 5, 2019

(87) PCT Pub. No.: WO2018/182427
PCT Pub. Date: Oct. 4, 2018

(65) Prior Publication Data
US 2020/0015460 A1   Jan. 16, 2020

(30) Foreign Application Priority Data
Mar. 27, 2017   (NO) .................................. 20170497

(51) Int. Cl.
*A01K 61/65*   (2017.01)
(52) U.S. Cl.
CPC .................................. *A01K 61/65* (2017.01)

(58) Field of Classification Search
CPC ......... A01K 61/65; A01K 61/00; A01K 61/60
(Continued)

(56) References Cited

U.S. PATENT DOCUMENTS 5,762,024 A * 6/1998 Meilahn ................. A01K 61/60
119/223
5,967,086 A * 10/1999 Knott, Sr. .............. A01K 61/60
119/223
(Continued)

FOREIGN PATENT DOCUMENTS

CN   1178574 C  * 12/2004  ............ A01K 61/00
EP   0260272 A1   3/1988
(Continued)

*Primary Examiner* — Brady W Frazier
*Assistant Examiner* — Jodutt Basrawi

(57) ABSTRACT

A floating plant (8) comprises a container (1) and a mooring element (2) provided with respective guide elements (10, 13). The guide elements have a mutual complementary shape such that the container (1) and the mooring element (2) may move freely with respect to each other in directions that coincide with the container central axis (CL). A plurality of elongated buoyancy elements (10) are arranged on the container outside and arranged between the container bottom end (17) and the container upper end (18), preferably parallel with the container central axis (CL). The container may be transported to the installation site, floating in the water and stabilized by means of the buoyancy elements (10). The mooring element (2) may be transported to the installation site, either in one piece or on several pieces (2a, 2b), and mounted such that it surrounds a portion of the container. The container is raised and lowered in the body of water by controlling the amount of water in the container.

17 Claims, 10 Drawing Sheets

(58) Field of Classification Search
USPC ........................................................ 119/223
See application file for complete search history.

(56) References Cited

U.S. PATENT DOCUMENTS

| | | | | |
|---|---|---|---|---|
| 7,717,065 B2* | 5/2010 | McRobert | ............... | A01K 61/60 |
| | | | | 119/226 |
| 8,230,813 B1* | 7/2012 | Birdwell | ................ | A01K 63/02 |
| | | | | 119/203 |
| 8,371,245 B2* | 2/2013 | Papadoyianis | ......... | A01K 61/60 |
| | | | | 119/223 |
| 8,770,149 B2* | 7/2014 | Mizrachi | ................ | A01K 61/60 |
| | | | | 119/223 |
| 8,813,684 B2* | 8/2014 | Buchanan | ............... | A01K 61/60 |
| | | | | 119/223 |
| 8,925,489 B2* | 1/2015 | Hoie | ....................... | A01K 61/60 |
| | | | | 119/223 |
| 10,123,516 B2* | 11/2018 | Robinson | ............. | A01K 63/047 |
| 10,918,094 B2* | 2/2021 | Sandstad | ................ | A01K 61/60 |
| 2008/0110408 A1* | 5/2008 | Thorvardarson | ...... | A01K 61/00 |
| | | | | 119/223 |
| 2010/0287829 A1* | 11/2010 | Bussell | ................... | C12M 21/02 |
| | | | | 47/1.4 |
| 2012/0117850 A1* | 5/2012 | Panovic | ................. | A01K 79/00 |
| | | | | 43/4.5 |
| 2015/0083050 A1* | 3/2015 | Brosh | .................... | A01K 61/60 |
| | | | | 119/200 |
| 2015/0359206 A1* | 12/2015 | Naess | .................... | A01K 63/04 |
| | | | | 119/215 |
| 2019/0059339 A1* | 2/2019 | Jakobsen | ............... | A01K 61/60 |

FOREIGN PATENT DOCUMENTS

| | | | | | |
|---|---|---|---|---|---|
| KR | 100696872 B1 | * | 3/2007 | ............. | A01K 61/00 |
| KR | 100876227 B1 | * | 12/2008 | ............. | A01K 61/00 |
| KR | 20110047472 A | * | 5/2011 | ............. | A01K 61/00 |
| KR | 20160008335 A | * | 1/2016 | ............. | A01K 61/00 |
| NO | 336739 B1 | * | 3/2015 | ............. | A01K 61/60 |
| WO | WO-8704319 A1 | | 7/1987 | | |

* cited by examiner

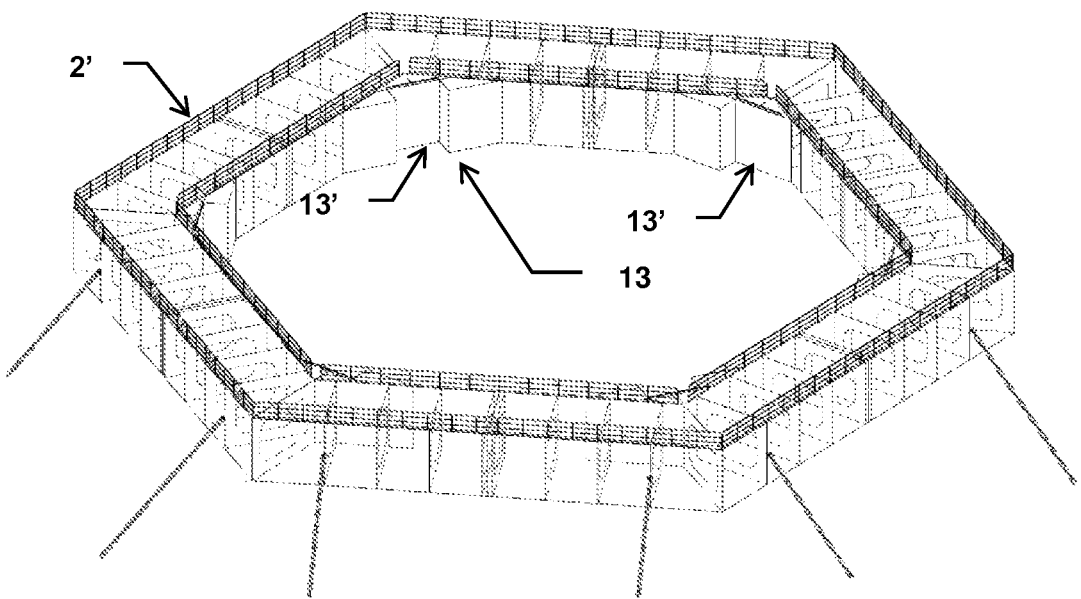
Fig. 17
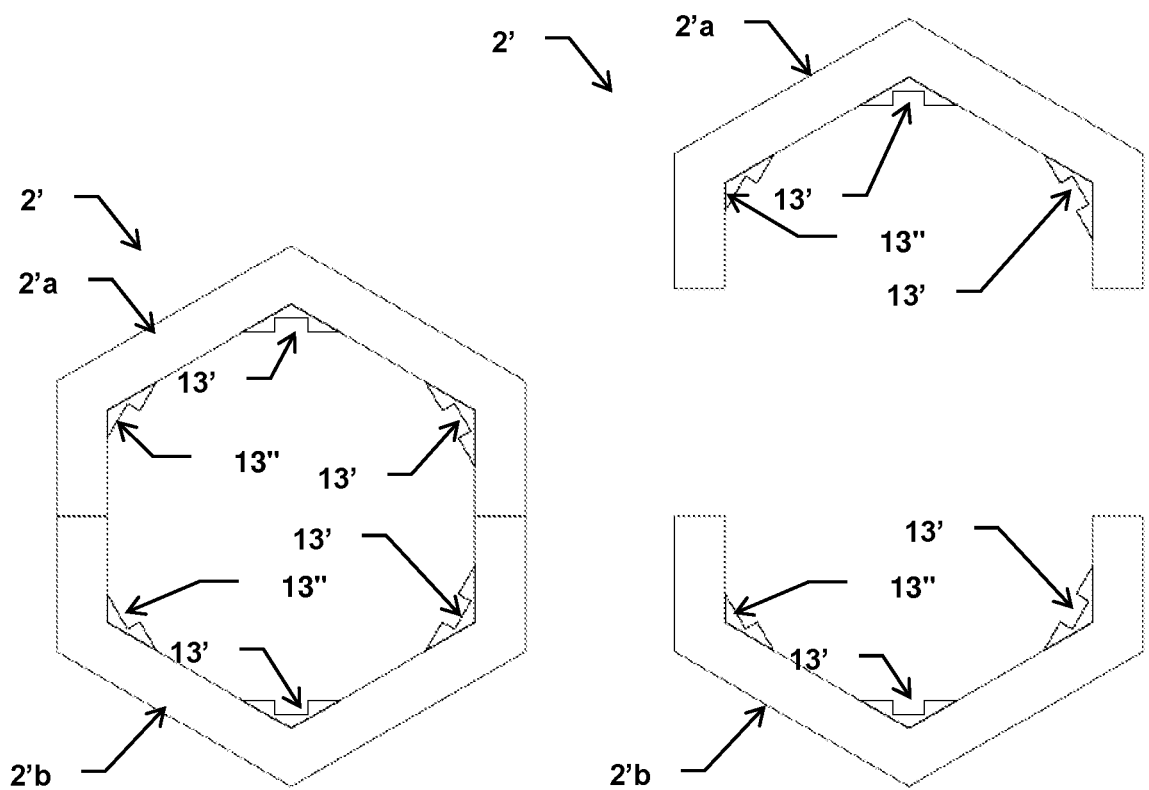
Fig. 18 (a) (b)

FLOATING MARINE PLANT FOR CONTAINING MARINE ORGANISMS

CROSS-REFERENCE TO RELATED APPLICATIONS

This application is the National Stage of International Application No. PCT/NO2018/050085, filed Mar. 23, 2018, which claims the benefit of Norwegian Application No. 20170497, filed Mar. 27, 2017. The contents of both applications are hereby incorporated by reference in their entirety.

FIELD OF THE INVENTION

The invention concerns a floating plant. The plant is suitable for the breeding or containment of fish and other marine organisms.

BACKGROUND OF THE INVENTION

The prior art within the area of fish pens includes Norwegian patent No. 336739 B1, which describes a cage device for containing live fish before slaughtering, where the device forms an intermediate cage or buffer cage. The cage device comprises a frame, a side wall and a bottom, and may be raised and lowered in the water. The bottom may be a perforated, installed fabric, or an installed seine, a metal wire screen, grill or similar. The frame comprises a number of vertical lifting pipes with a top end and a bottom end, at least a pressure equalizing system for equalizing or control the pressure in the vertical lifting pipes, one or more horizontal stabilizing pipes, and a ballasting system. The vertical lifting pipes are pneumatically interconnected near the top of the cage device, above the water surface, and the ballasting system is arranged near the bottom end of the vertical lifting pipes. The at least one stabilizing pipe extends along and around the periphery at a location between the lifting pipes top end and bottom end and the cage device bottom is arranged at a location between the lifting pipes top end and bottom end, such that the cage device is stable and generally horizontally in the water with the bottom in or above the water surface when the pen device in a raised position.

The prior art also includes U.S. Pat. No. 8,770,149 B2, which discloses a breeding plant in which a container with impermeable walls is provided with several hatches in the walls. A ring-shaped floatation element is arranged at the upper (open) end of the container. The container bottom is funnel-shaped for collection of waste.

The prior art also comprises CN 105994065 A, which discloses a breeding plant having a net cage and a balanced lifting system. The plant has vertical balancing pipes on the outside of the cage, which makes it possible to lower and raise the cage in a controlled manner.

The prior art also includes includes WO 87/04319 A1, which describes an enclosure for breeding fish, said enclosure having flexible side walls made from a material that may, e.g. be a perforated plastic sheet or a net having meshes. The upper side wall portion is secured to an upper buoyancy or floating frame. The lower side wall portion is secured to a liftable and lowerable frame for lifting the bottom of said enclosure from its immersed position in the water to an upper position in the water, to facilitate catching operations of bred fish, and maintenance of the sheet/net material of said enclosure. Guide means for centration of frames comprise guide stay means attached to lower frame and passing through guide sleeves in said upper floating frame. The bottom of said enclosure consists of a rigid plate having a central portion being lower than the marginal portions to collect sediment that is removed by the aid of a device to a purification plant.

The prior art also includes JP H06 169671 A, which describes a fish farming plant having a guide part slidably attached to a post which is moored to a sunk weight and extending vertically in the water by buoyancy. A gangboard supported on the water surface with buoys is connected to the guide part. The upper edge of a net (seine) is attached to the gangboard.

The prior art also includes JP S64 22262 U, which describes a net cage connected to a frame. The frame is furnished with adjustable buoyancy elements, by means of which the frame and net cage may be raised and lowered in the water. The frame movement is restricted by guide wires.

SUMMARY OF THE INVENTION

The invention is described and characterized in the independent patent claim, while the dependent patent claims describe other characteristics of the invention.

It is thus provided a floating plant, comprising a container configured for floating in a body of water, and a mooring element configured for floating in a body of water, characterized in that
 the container is provided with one or more guiding structures and the mooring element is provided with one or more guide elements;
 wherein the guiding structures and the guide elements have mutual complementary shapes such that the container and the mooring element can move freely with respect to each other in directions that coincide with a central axis of the container.

In one embodiment, one or more of the guiding structures comprise elongated elements extending between a region of a container bottom end and a region of a container upper end. One or more of the guiding structures may comprise buoyancy means, and the floating plant may comprise further buoyancy means.

In one embodiment, the guiding structures are arranged on the container outer side and arranged parallel with the container central axis. The container may be cylinder-shaped and the guiding structures may be are arranged symmetrically in relation to the container cylinder shape. The guiding structures may be placed symmetrically about the container circumference, with the same angular distance between adjacent structures.

In one embodiment, the guide elements are placed in the mooring element with the same angular distance between adjacent guide elements.

In one embodiment, the container has an impermeable wall and an impermeable bottom, and an upper opening. The bottom may be funnel-shaped and at least one evacuation hose may be connected to a lower opening in the funnel-shaped bottom.

In one embodiment, the mooring element comprises mooring means for mooring to a seabed, and one or more buoyancy chambers, whereby the mooring element may float in a water surface. The mooring element may comprise two or more sections that can be mounted around the container when the container and the sections are floating in the water.

In one embodiment, the floating plant further comprises one or more water intake systems, each water intake system comprising a water intake tubular having an inlet in fluid communication with the body of water outside the container when the plant is in use; said tubular fluidly connected to one or more outlets which extend through the container wall and into the container, wherein at least a portion of the conduit between the intake tubular and the one or more outlets comprise a flexible conduit. The intake tubular may be connected to and supported by the mooring element and fluidly connected to an intake pump system in the mooring element. The flexible conduit may be supported by the mooring element and fluidly connected to the intake pump system in the mooring element.

In one embodiment, the container comprises a support member for abutment against at least a portion of the mooring element. The support member may comprise a circumferential ledge arranged in an upper region of the container.

The floating plant may be a plant for breeding and/or containing fish or other marine organisms.

It is also provided a method of installing the floating plant according to the invention, characterized by:

a) transporting the container to the installation site, floating in the water and stabilizing the container by means of buoyancy means;

b) transporting the mooring element to the installation site, either in one piece or in several parts;

c) mounting the mooring element such that it surrounds a portion of the container.

It is also provided a method of raising and lowering a container in a body of water, relative to a mooring element, in the floating plant according to the invention, characterized by controlling the amount of water in the container.

The invention represents an improvement of the prior art, both in terms of fabrication, load-out, assembly and installation at the a designated location, as well as operation when the plant is in use.

BRIEF DESCRIPTION OF THE DRAWINGS

The above mentioned and other characteristics of the invention will be explained in more detail in the following description of embodiments, presented as non-limiting examples and with reference to the accompanying drawings, wherein:

FIGS. 16 and 17 are perspective drawings of the second embodiment of the mooring element according to the invention, with and without outer plate structure, respectively;

FIGS. 18a and 18b are plan views and principle sketches of the second embodiment of the mooring element according to the invention, illustrated in an assembled state and an unassembled state, respectively;

DETAILED DESCRIPTION OF EMBODIMENTS

Figure 1:
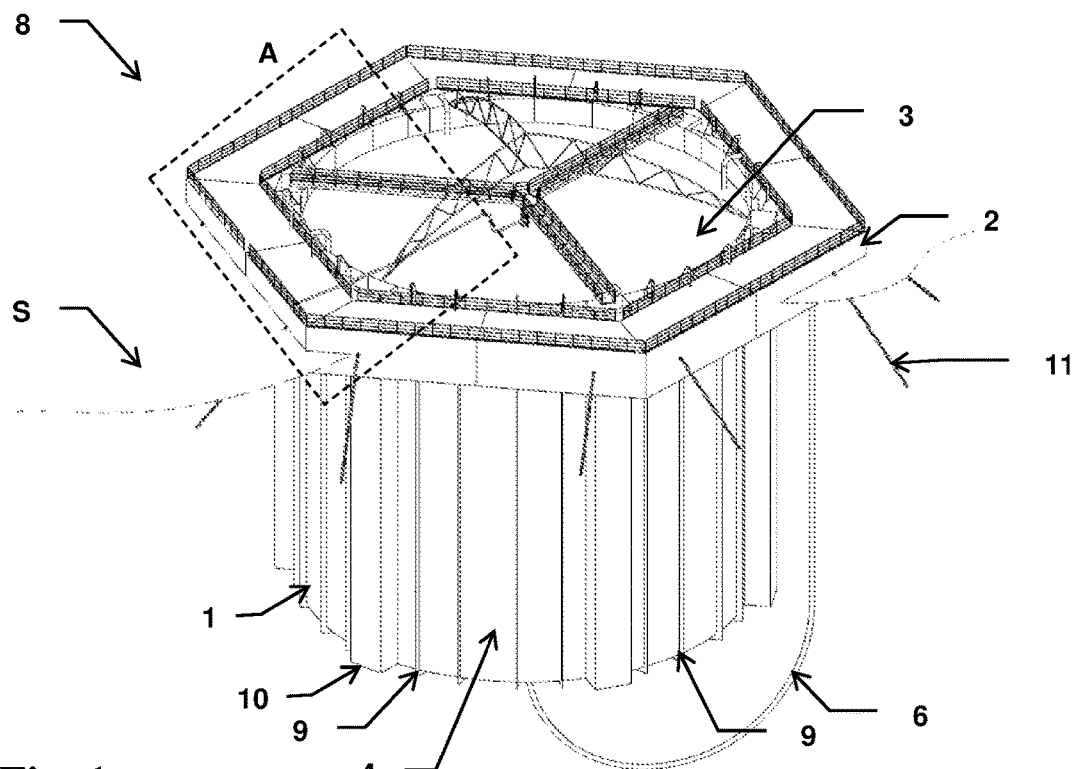
FIG. 1 is a perspective drawing of a first embodiment of the plant according to the invention floating in a body of water, and shows a state in which the container is surrounded by the mooring element and is in a lowered position relative to it.

The following description will use terms such as "horizontal", "vertical", "sideways", "back and forth", "up and down", "upper" "lower" "inner", "outer" "forward", "rear", etc. These terms refer primarily to the views and orientations shown in the drawings and that are related to a normal use of the invention. The terms are used only to facilitate the reading of the description and shall not be limiting.

Figure 2:
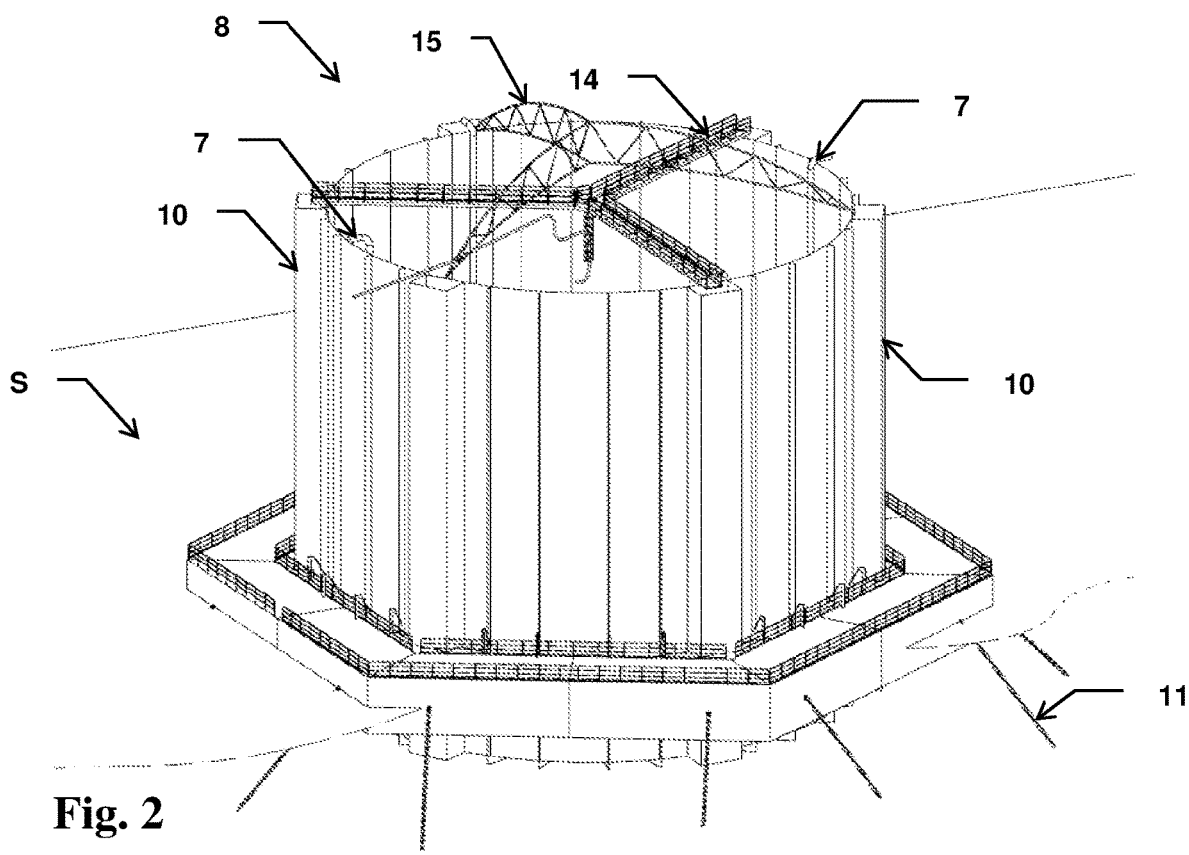
FIG. 2 corresponds to FIG. 1, but shows a state in which the container is in a raised position relative to the mooring element.
Figure 8:
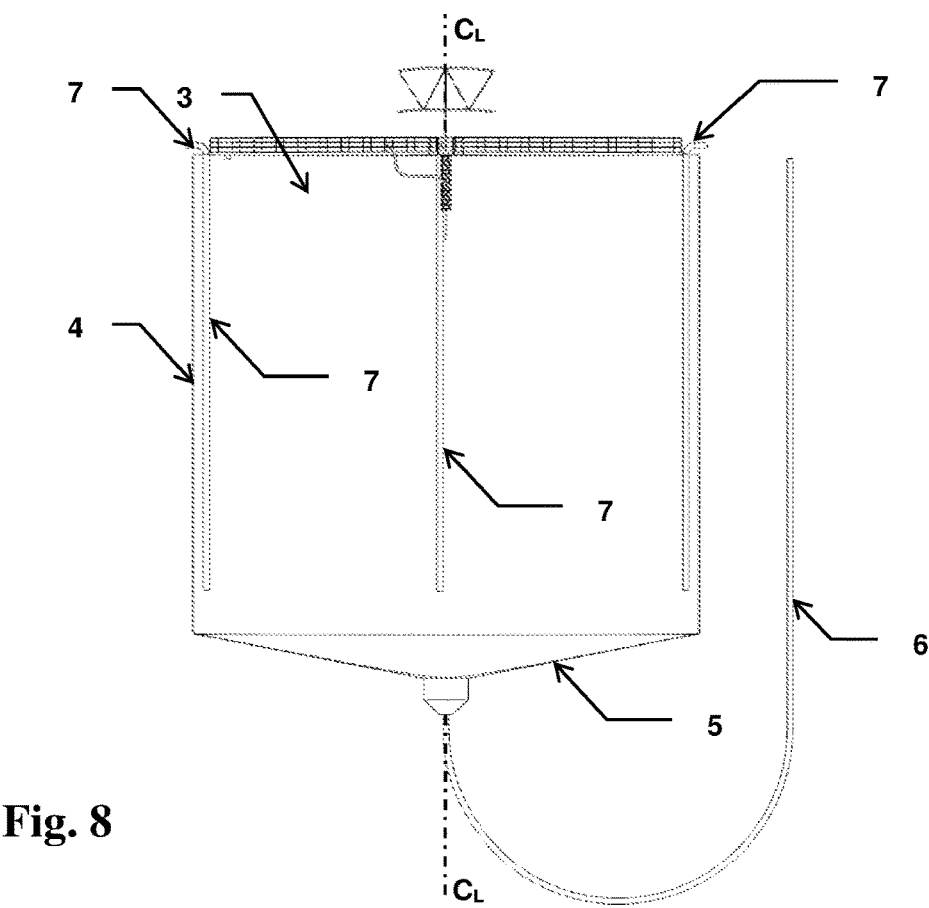
FIG. 8 is a sectional drawing of the first embodiment of the container according to the invention.
Figure 9:
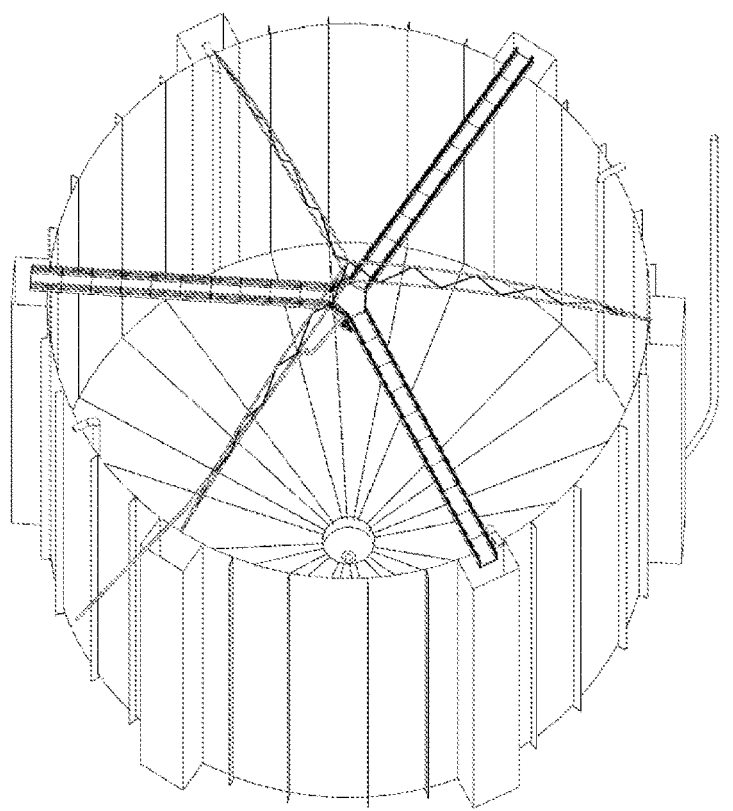
FIG. 9 is a perspective drawing of the first embodiment of the container according to the invention.

Reference is initially made to FIGS. 1, 2 and 8. The breeding plant 8 comprises in the illustrated embodiment two main components: a container 1 and a floating mooring element 2. Although the term "breeding plant" will be used in the following, it should be understood that the plant may have other applications. The invention shall therefore not be restricted to a use in breeding fish or other marine organisms.

In the illustrated embodiment, the container 1 (which is configured for holding fish, other marine organisms or objects) has an impermeable wall 4, a funnel-shaped bottom 5 and an upper opening 3. The wall and bottom materials are preferably steel of a grade appropriate for the intended use. The container is in the illustrated embodiment cylinder-shaped, but the invention shall not be limited to such shape. The container 1 is essentially a cage structure having an open top. Although the wall 4 and bottom 5 in the illustrated embodiments are described as being impermeable, solid structures, it should be understood that the wall and bottom also may comprise one or more openings, with or without a net or wire mesh, where the net or wire mesh are dimensioned to prevent passage of fish or other marine organisms but allow fluid flow.

A hose 6 is connected to a hole in the funnel-shaped bottom (for evacuating fish and waste material). There may be more hoses (not shown) connected to the bottom. A plurality of pipes 7 extend inside the container, from the container upper end and down towards the container bottom. Seawater may be filled into the container 1 via the pipes 7 and/or via the hose 6. The container 1 may be emptied of water via the pipes 7 and/or via the hose 6.

The container 1 has preferably a plane (smooth) inner wall. Structural stiffness may be obtained by external vertical ribs 9.

Gangways 14 provide access above the container, and truss structures 15 above the container serve as structural stiffeners and frames for nets and/or tarpaulins (not shown).

Figure 7:
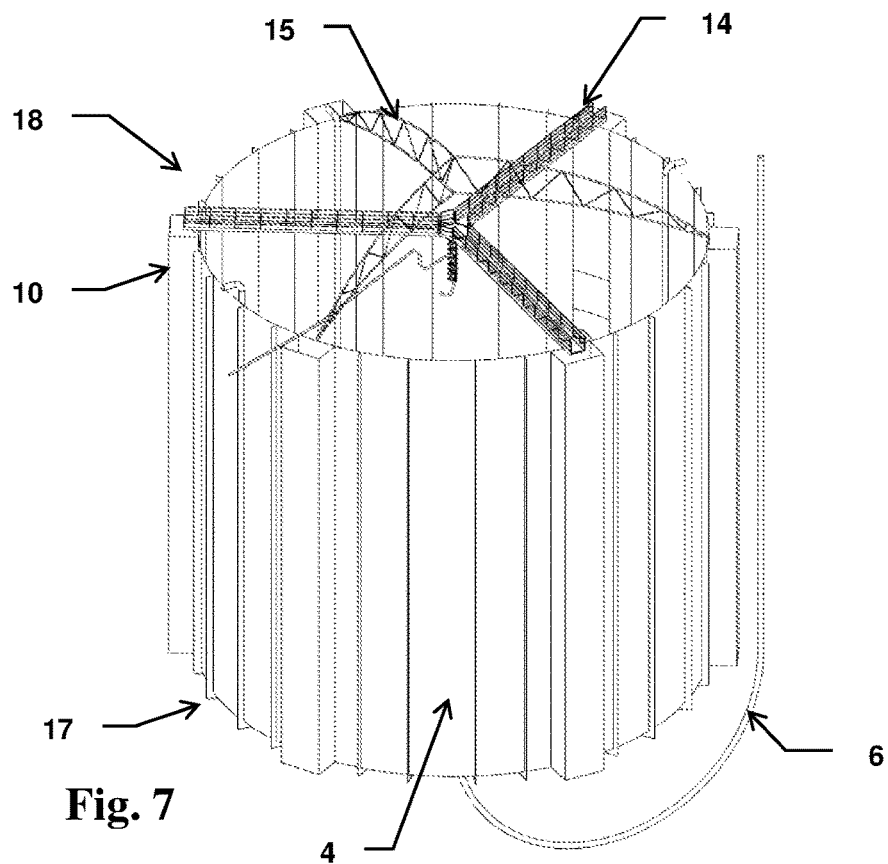
FIG. 7 is a perspective drawing of the first embodiment of the container according to the invention.

The container 1 is provided with a plurality of (here: 6) structures 10, here in the form of buoyancy elements, which extend between the container bottom end 17 and the container upper end 18 (see FIG. 7). In the illustrated embodiment, the structures (buoyancy elements) extend along the container outer wall 4, parallel with the container central axis $C_L$ (see FIG. 8), in other words vertical or approximately vertical when the container is floating in the water. The buoyancy elements 10 are placed symmetrically about the container circumference, with the same angular distance. For example, in one embodiment (not shown) the container may be provided with three buoyancy elements, such that the angular distance between adjacent elements is 120°.

In one embodiment the structures 10 comprise buoyancy elements having air-tight chambers. The chambers may have valves or inspection hatches (not shown), but these are kept in a closed position when the breeding plant is in use. Raising or lowering of the container is accomplished by controlling the amount of water in the container. In addition, the structures may comprise buoyancy tanks (not shown) into which air may be blown, or air may be forced into said chambers (in order to i. a. compensate for weight of marine growth).

The buoyancy elements 10 preferably extend over the entire height of the container 1 (between upper and lower portion 18, 17), and allow the container to be floating stable in the water, also in a transient phase where the container is filled gradually with water, i.e. from being empty to being full of water, and vice versa. Also, the container 1 is not dependent on the mooring element 2 to be stable in the water. The container 1 may thus be launched to sea and towed without the assistance of the mooring element or other buoyancy means.

Figure 4:
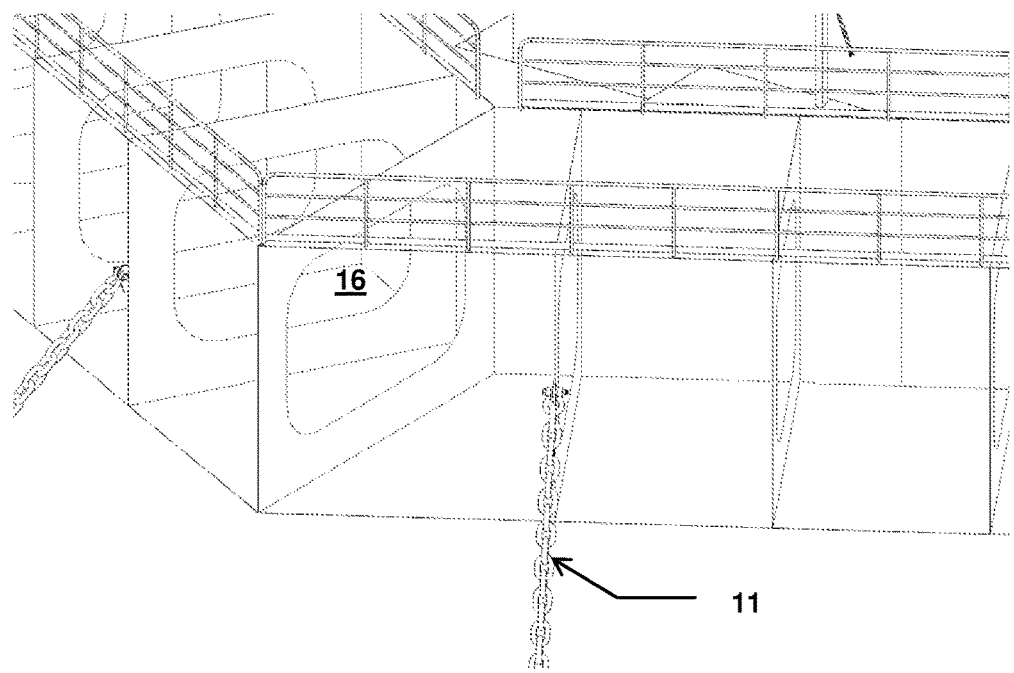
FIG. 4 is a perspective drawing of a portion of the first embodiment of the mooring element according to the invention, where outer plate structure has been removed to illustrate internal structure.

The mooring element 2 comprises buoyancy chambers 16 (see FIG. 4) such that it floats in the water surface, and is provided with mooring lines or chains 11 for mooring to the seabed (not shown).

The mooring element 2 may be provided with several locking devices 12 (see FIG. 3) that are configured for locking engagement with the container 1. The container 1 and the mooring element 2 may thus be interlocked if desirable. The interlock may be rigid or flexible, and the locking device may thus comprise e.g. bolted connections or flexible chains.

Figure 3:
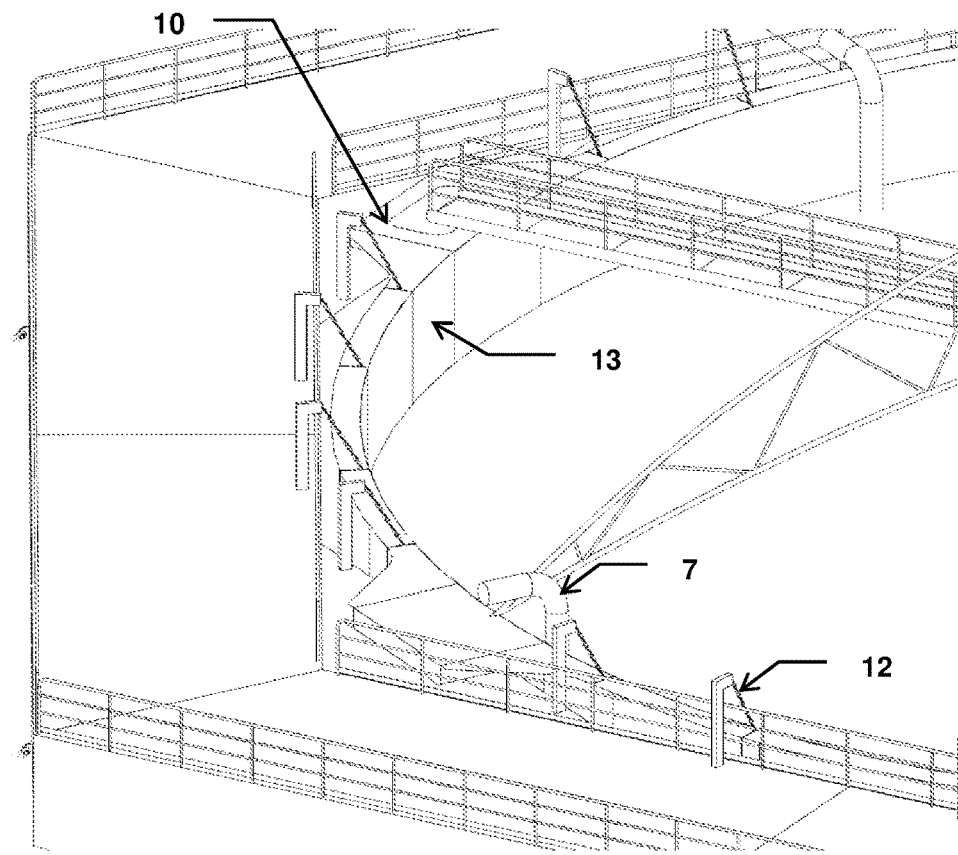
FIG. 3 is a perspective drawing of a portion of the plant according to the first embodiment of the invention, corresponding to the area marked "A" in FIG. 1.
Figure 5:
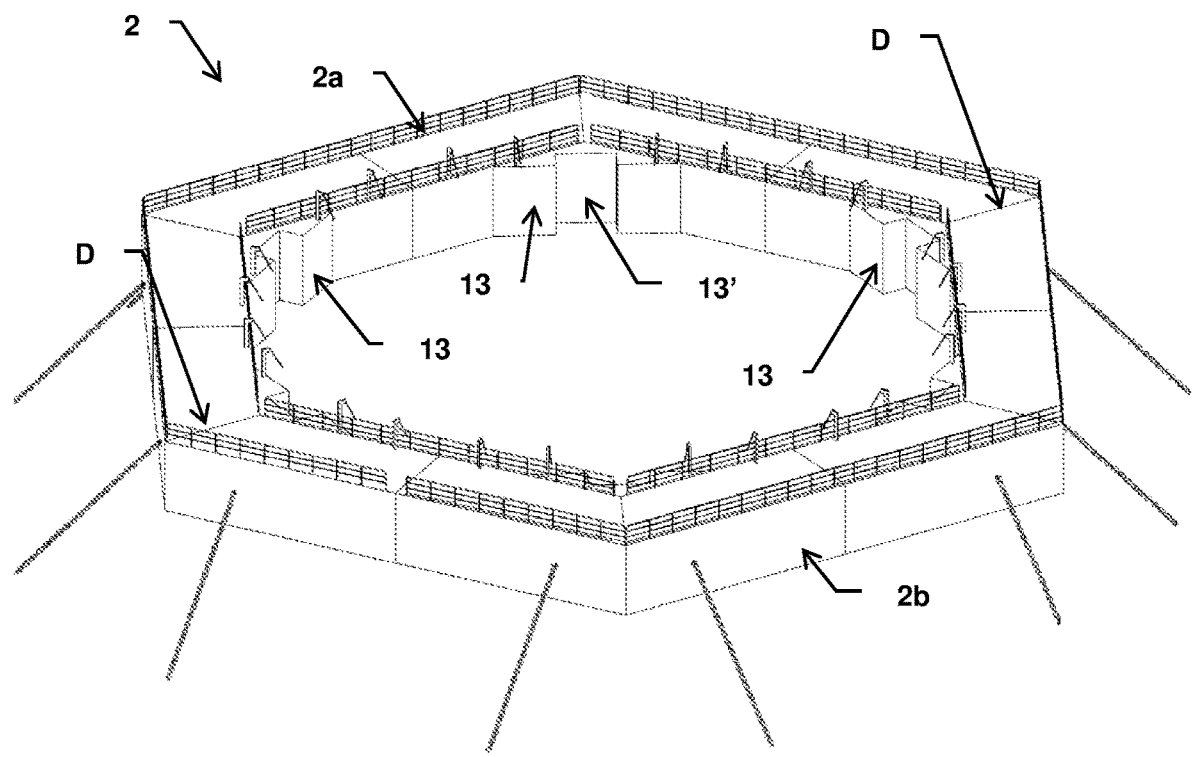
FIGS. 5 and 6 are perspective drawings of the first embodiment of the mooring element according to the invention, with and without outer plate structure, respectively.
Figure 6:
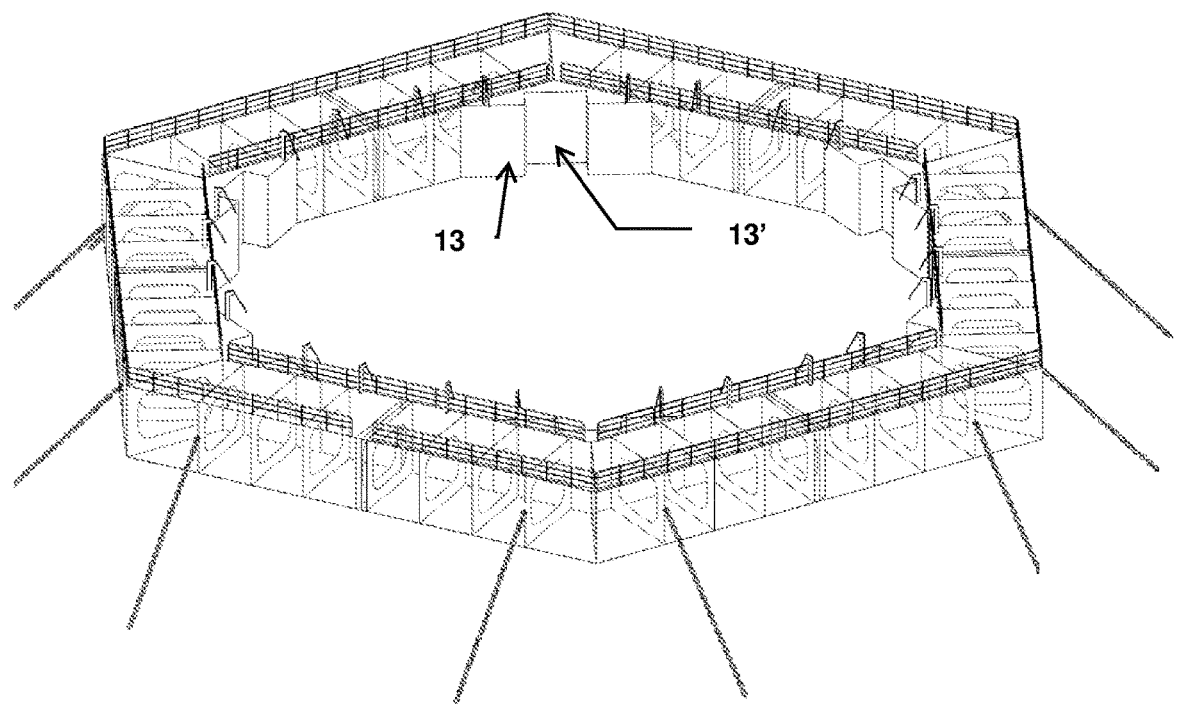

The mooring element 2 is provided with guide elements (guide structures) 13 (see i. a. FIGS. 3, 5 and 6), and each guide element 13 is configured to fit the outside shape of a corresponding structure 10 (buoyancy element 10 in see FIG. 3). The guide elements 13 are placed in the mooring element with the same angular distance between adjacent guide elements 13, and this angular distance corresponds to the angular distance between adjacent structures (buoyancy elements) 10, as discussed above. In the illustrated embodiment, each guide element 13 comprises a groove 13' which is adapted to the outside shape of a corresponding structure (buoyancy element) 10. Each structure 10 may thus move back and forth (up and down) in a respective groove 13'. The structure 10 therefore also functions as a guiding structure (in addition the function as a buoyancy element), i. a. to prevent the mooring element 2 and the container 1 from rotating with respect to one another. It should be understood that the guiding structure and the buoyancy element may be separate elements, i.e. while some of the structures 10 may comprise buoyancy elements, others may not.

The invention shall not be limited to the grooves 13' as illustrated in the disclosed embodiment. A fundamental aspect of the invention is that the container 1 and the mooring element 2 freely may move with respect to each other in a vertical direction, that is along the container central axis $C_L$.

FIG. 1 shows the container 1 filled with water in a lowered position. The majority of the container is submerged in the seawater. It should be understood that the buoyancy generated by the buoyancy elements 10 is dimensioned to the weight of the container 1 when this is filled with water, such that the container assumes a lowered position when filled with water.

FIG. 2 shows a situation in which the container 1 is emptied of water, and thus raised to a surface position. In this position the container may be emptied of waste and be cleaned internally. The container has been raised to this position by virtue of the displaced volume of the emptied container, and assisted by the buoyancy generated by the buoyancy elements 10.

The optional locking devices 12 may be used when the container is in a fully lowered position, in a fully raised position, and in all intermediate positions.

When the breeding plant is in operation and the container is holding fish or other marine organisms, there will generally be continuous water circulation in the container 1 (i. a. to generate currents and to provide oxygen-rich water).

When the container 1 is filled with water and is in a lowered position, it will normally have a water level which is somewhat higher than the ambient water, to ensure a positive pressure difference.

Because of the small pressure difference between water inside the container and water outside, the container walls 4 may be relatively thin. In addition, structural stiffness may be maintained by the external vertical ribs 9.

The container 1 may be built, launched and transported at sea without the use of the mooring element 2. This is made possible by the container's impermeable walls 4 and impermeable bottom 5, and the vertical buoyancy elements 10.

The mooring element 2, which advantageously may have a hexagonal shape (as illustrated) may be built in two or more parts 2a, 2b which may be launched and towed to an assembly site, where they may be mated (assembled) around a container along the assembly lines D (see FIG. 5).

There is no need for designated lifting devices in order to lift and lower the container relative to the mooring element. Raising and lowering are accomplished solely by controlling the amount of water inside the container, and/or by dimensioning the buoyancy generated by the structures 10. It should be understood that in one functional variant of the invention, the structures 10 provide no buoyancy whatsoever.

Figure 10:
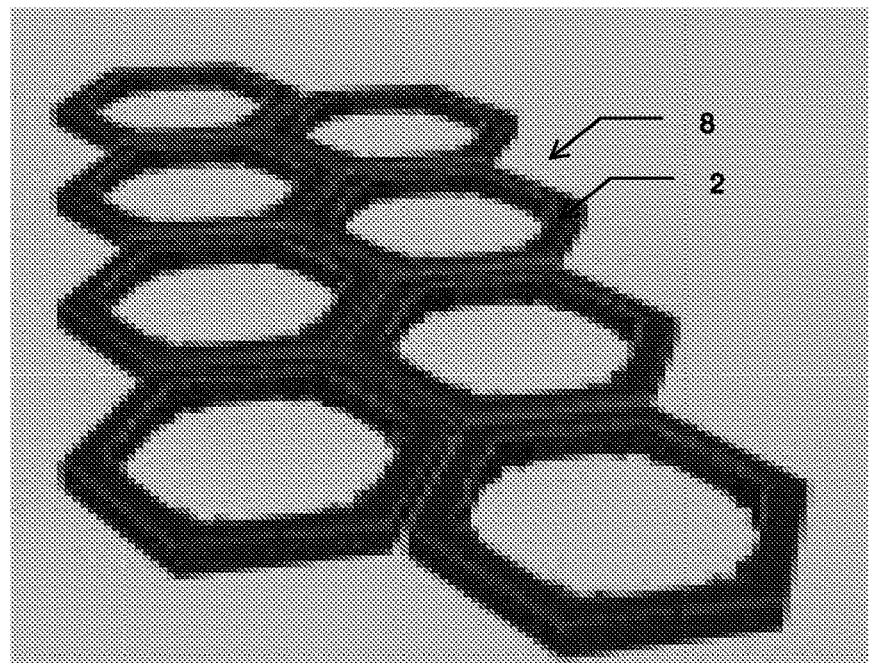
FIG. 10 is a perspective drawing of an assembly of eight plants according to the first embodiment of the invention.

FIG. 10 shows several plants 8 interconnected via respective mooring elements 2.

Another embodiment of the invention will now be described with reference to FIGS. 11 to 20. Unless noted otherwise, the features, functions and other aspects of the first embodiment of the plant 8 described above, apply also to the second embodiment of the invented plant 8'.

Figure 11:
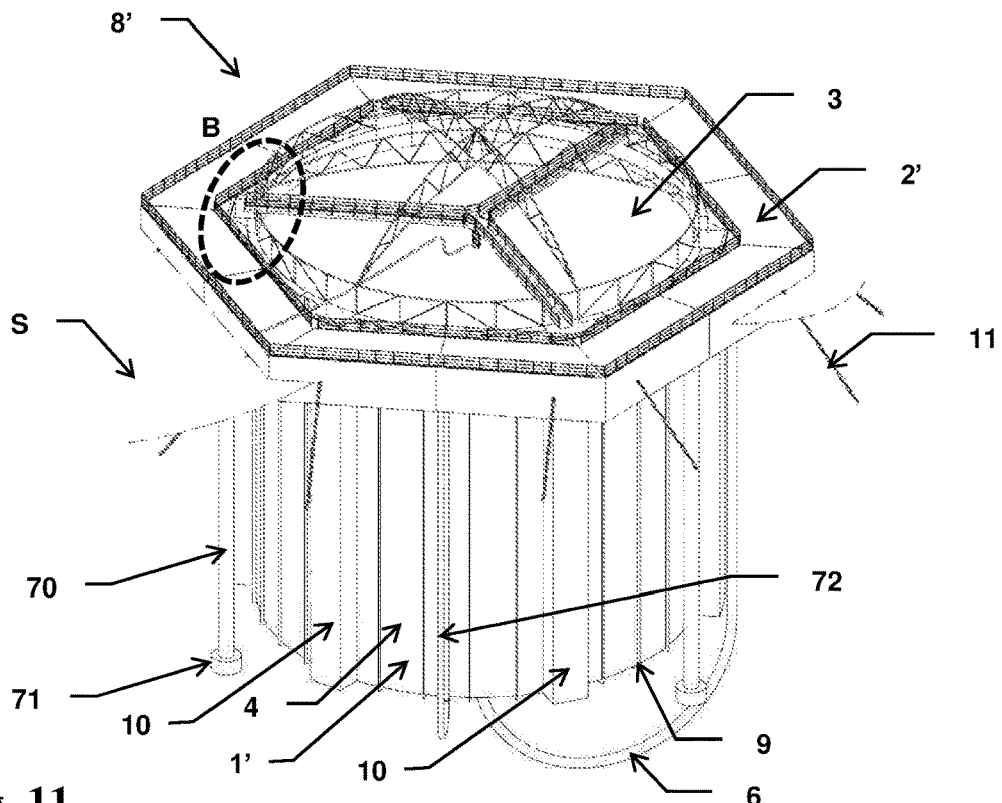
FIG. 11 is a perspective drawing of a second embodiment of the plant according to the invention floating in a body of water, and shows a state in which the container is surrounded by the mooring element and is in a lowered position relative to it.
Figure 12:
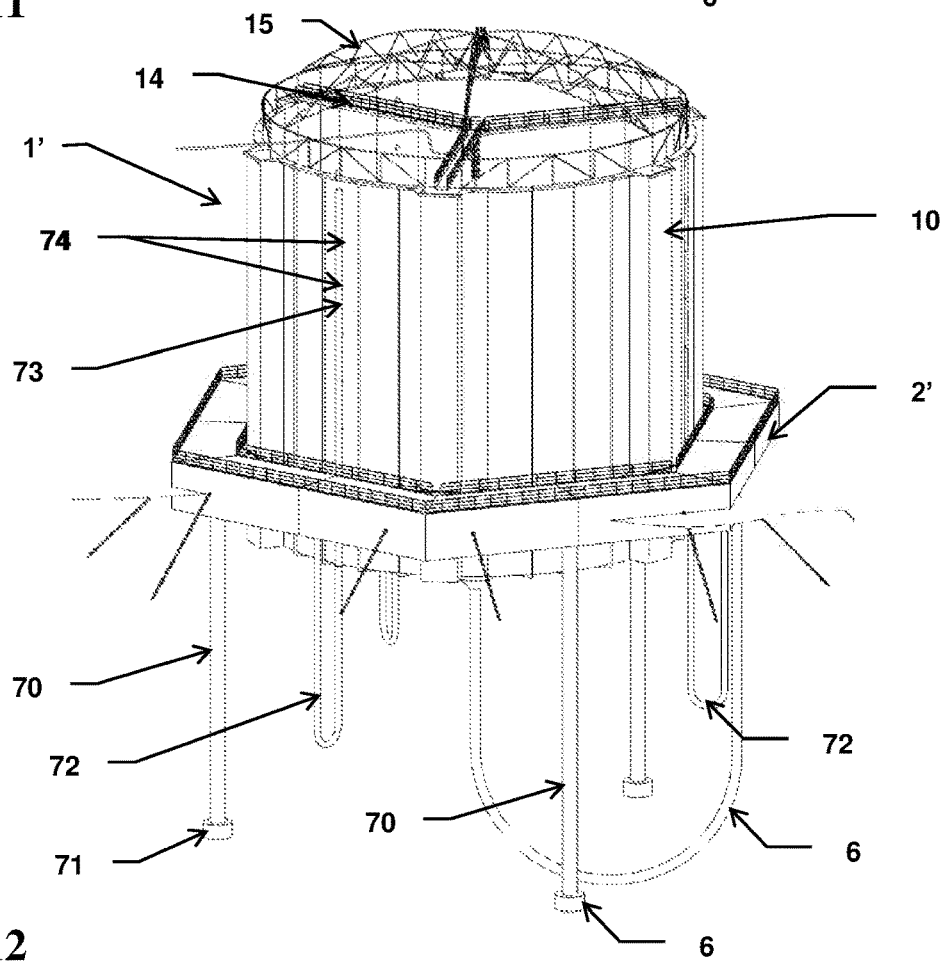
FIG. 12 corresponds to FIG. 11, but shows a state in which the container is in a raised position relative to the mooring element.
Figure 13:
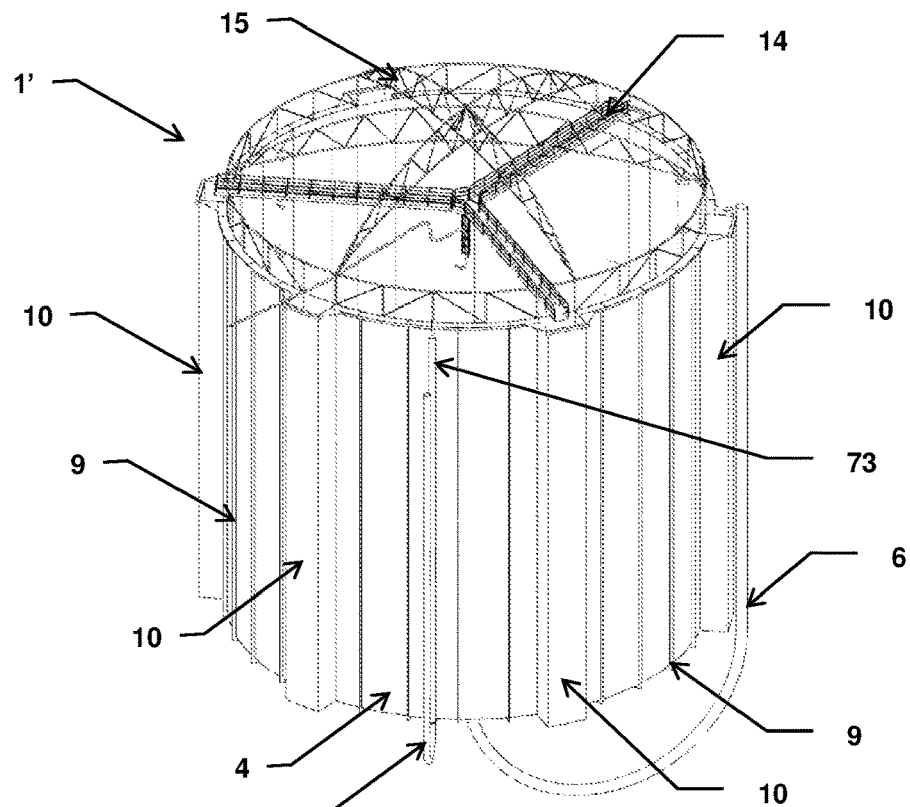
FIG. 13 is a perspective drawing of the second embodiment of the container according to the invention.
Figure 14:
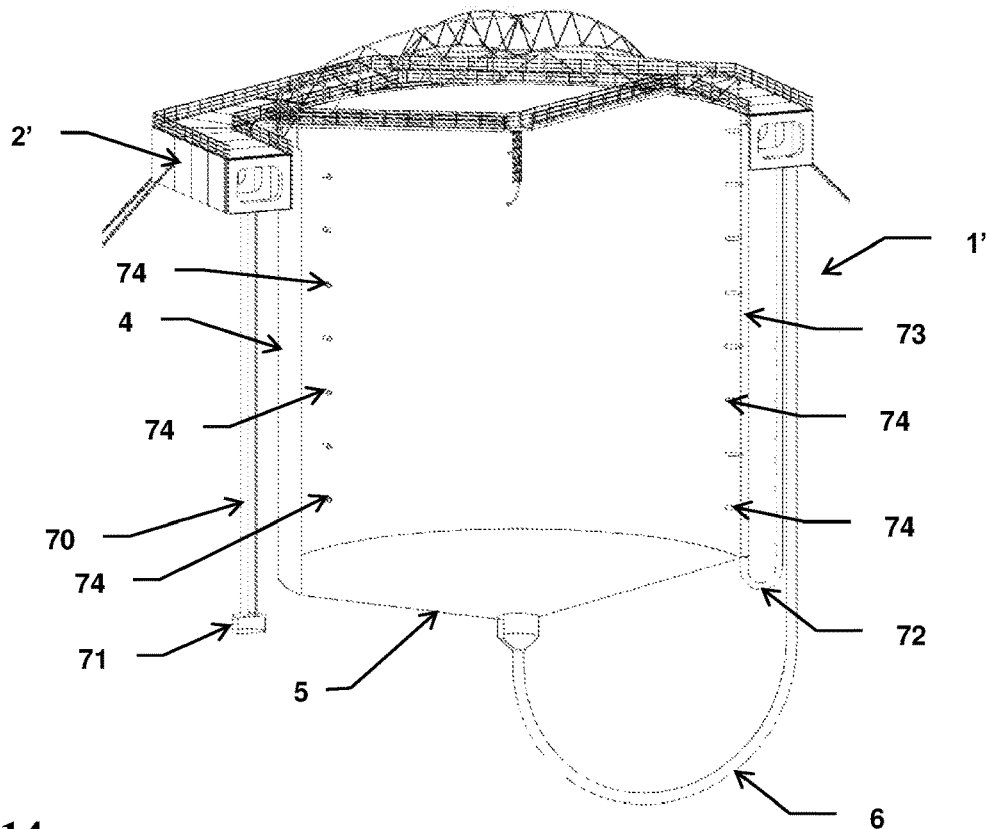
FIG. 14 is a sectional drawing of the embodiment illustrated in FIG. 11.

One difference between the plant 8 of the first embodiment and the plant 8' of the second embodiment is that the plurality of pipes 7 of the first embodiment have been replaced by a plurality of water intake systems in the second embodiment. Each water intake system comprises an inlet housing 71 which is connected to the lower end of an intake tubular 70. The intake tubular may be a rigid pipe or a flexible hose, and extends to a depth in the water corresponding to the lower end of the container 1' when the latter is in a lowered position (see i. a. FIG. 11). The intake tubular 70 is connected to and supported by the mooring element 2' and fluidly connected to an intake pump system (not shown) inside the mooring element 2'. Also fluidly connected to the intake pump system is a flexible conduit 72 (e.g. a hose, or similar). The flexible conduit 72 is supported by the mooring element 2' and extends into the water, along the length of the container 1'. At the lower end of the container 1', the flexible conduit 72 is fluidly connected to a tubular 73 which is connected to and extends upwards along the container 1' wall 4 (The tubular 73 may be a separate pipe or a continuation of the flexible conduit 72). The tubular 73 is fluidly connected to a plurality of outlets 74 which extend through the container wall and into the container. The flexible conduit 72 is sufficiently long to accommodate the full travel of the container 1', between the fully lowered position (FIG. 11) and the fully raised position (FIG. 12). FIG. 14 illustrates how the outlets 74 are arranged along the length of the container, and how a plurality of water intake systems are arranged around the container circumference.

Figure 15:
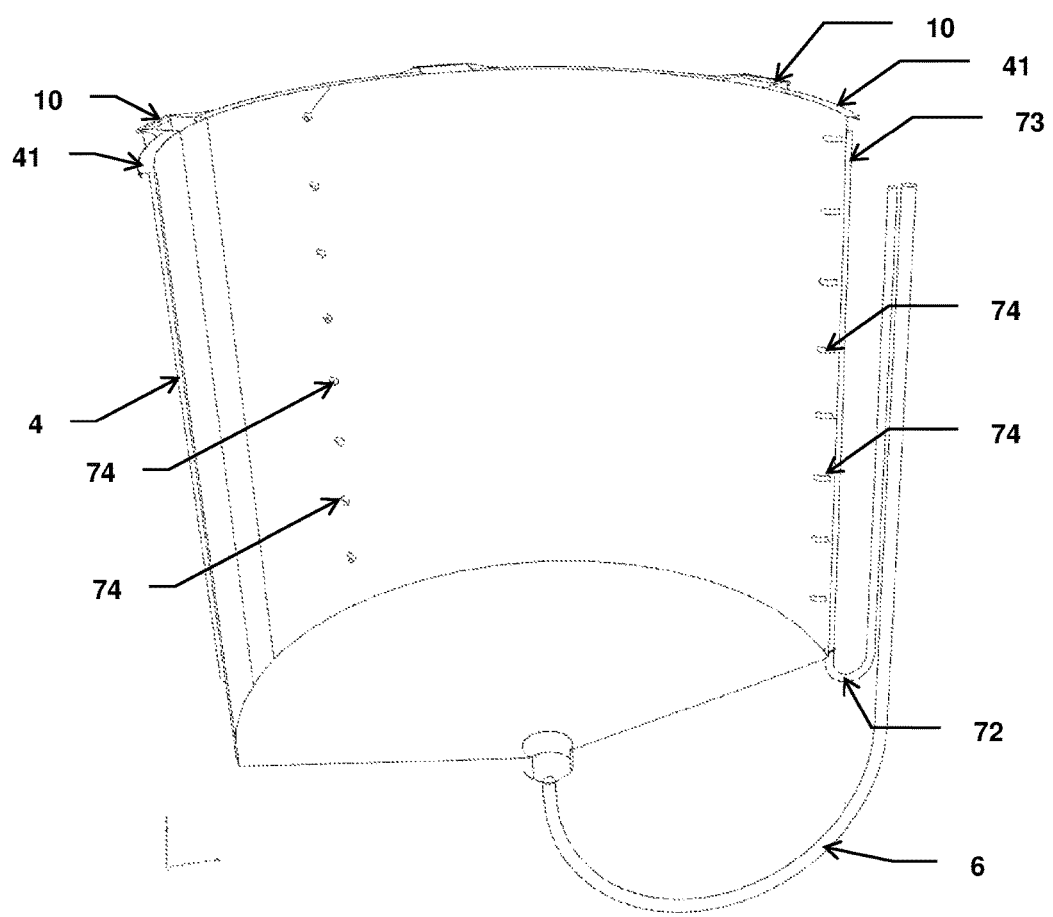
FIG. 15 is a sectionals drawing of the container illustrated in FIG. 13.
Figure 16:
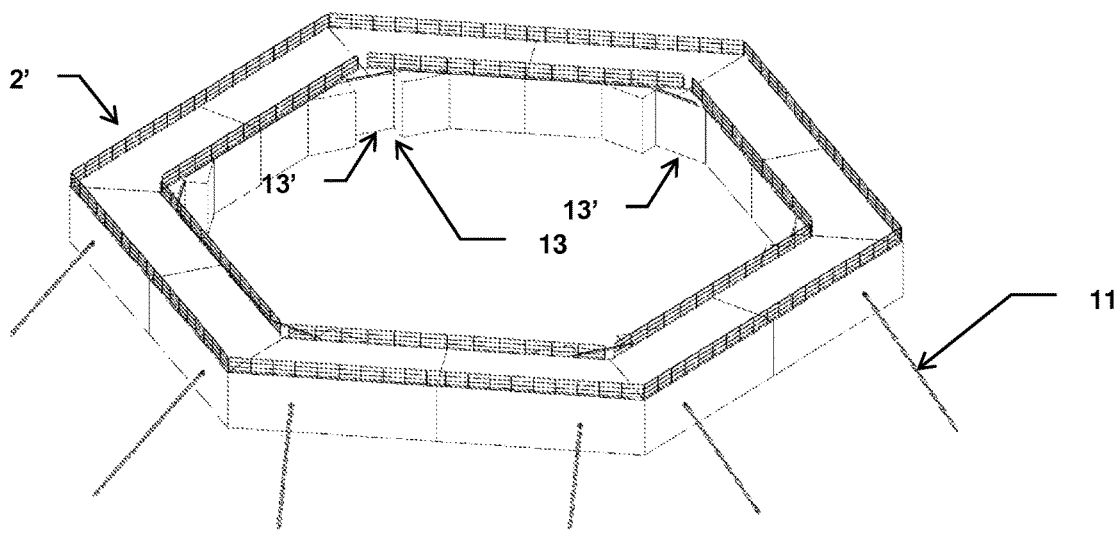
Figure 19:
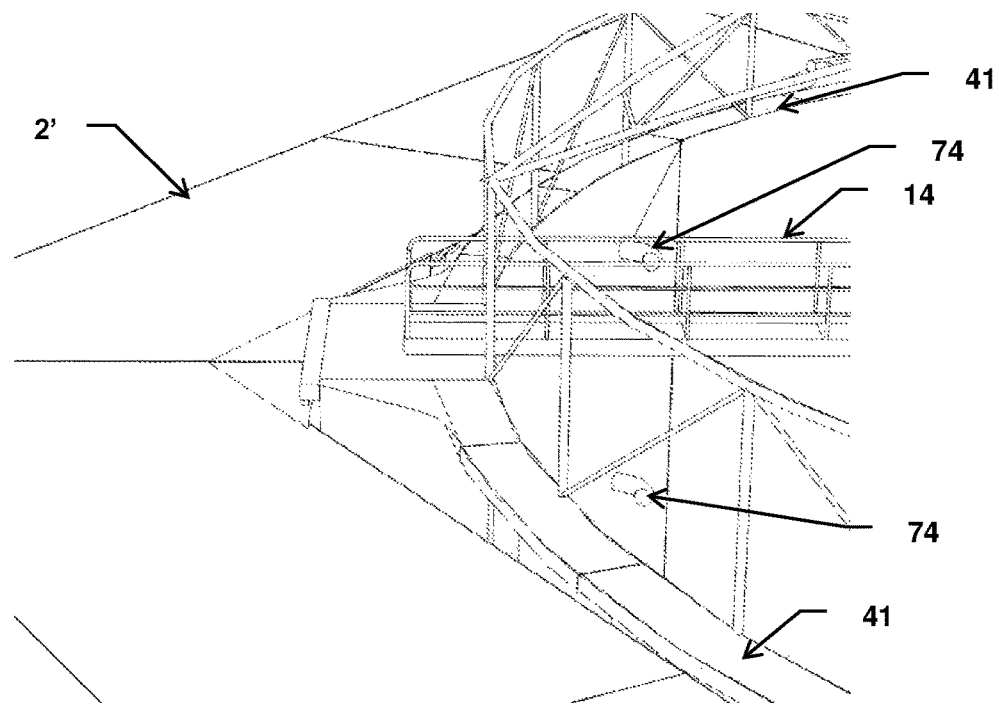
FIG. 19 is a perspective drawing of a portion of the plant according to the second embodiment of the invention, corresponding to the area marked "B" in FIG. 11 and where a portion of a guardrail has been removed.
Figure 20:
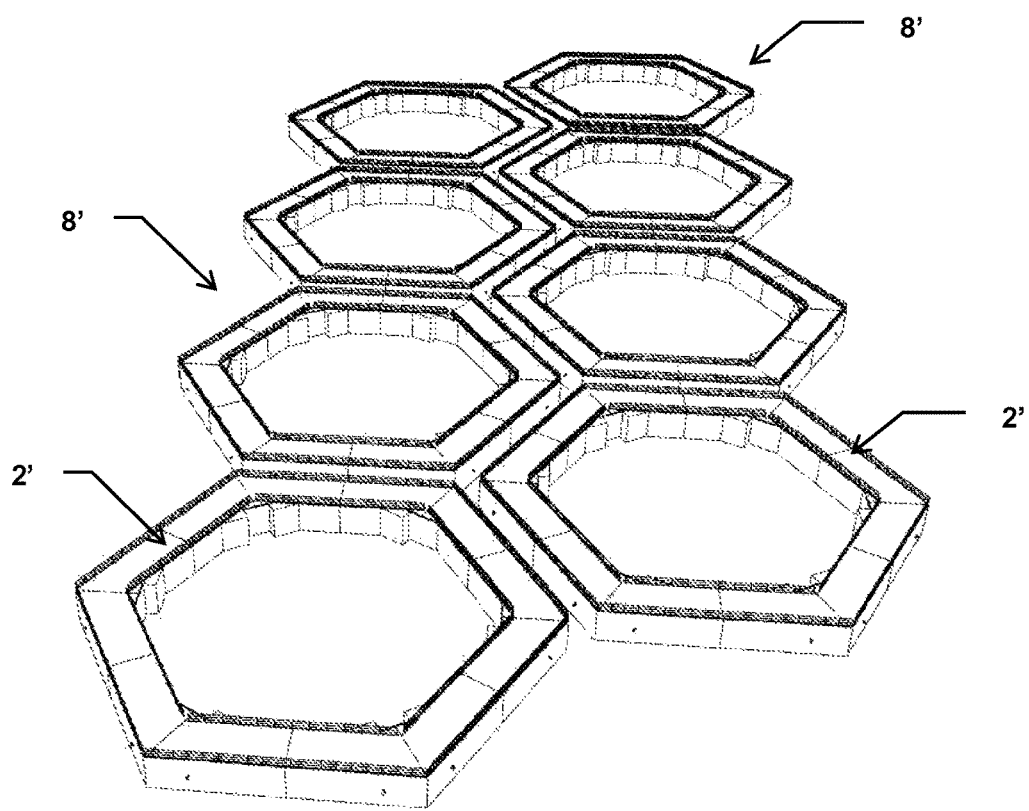
FIG. 20 is a perspective drawing of an assembly of eight plants according to the second embodiment of the invention.

FIGS. 15 and 19 illustrate how the outlets 74 have a curved shape, such that water ejected through the outlets is directed in along the container inner wall. This contributes to generate a swirling motion inside the container, and enhances water circulation.

Another difference between the plant 8 of the first embodiment and the plant 8' of the second embodiment is that the container 1' comprises a circumferential ledge 41 around its upper portion. FIG. 15 shows the circumferential ledge 41 arranged around the container upper rim, but the invention shall not be limited to this exact location. It should be understood that the ledge 41 may be replaced by a plurality of shorter ledges arranged around the container circumference, and/or that the ledge or ledges may be fixed to the container at locations below that shown in FIG. 15. The ledge 41 obviates the need for the locking devices 12 as described above with reference to the first embodiment, but may also be used in combination with the locking device. FIG. 19 illustrates how the ledge 41 is resting on a portion of the mooring element 2' when the container 1' is filled with water and is in a fully lowered position. The container is thus supported by the mooring element, via the ledge 41.

Although not illustrated, a variant of the invention may comprise container buoyancy elements which are selectively ballastable via valves and pump systems which per se are known. Such active ballast system enables the container stability to be controlled and improved, especially in demanding conditions with strong wind and/or current. A variant of the invention (not illustrated) may comprise a container in which the container wall and/or bottom are fully or partly open (e.g. having one or more openings with or without a net or wire mesh dimensioned to prevent passage of fish or other marine organisms). With this variant, buoyancy, raising and lowering of the container (cage) may be performed by the active ballast system and buoyancy is provided by structures comprising ballastable, buoyant members.

Although the invention have been referred to as a breeding plant, it should be understood that it may be used for other purposes. Examples of such other applications are intermediate storage of fish prior to further processing.

The invention claimed is:

1. A floating plant (8; 8'), comprising a container (1; 1') configured for floating in a body of water surrounded by a mooring element (2; 2') also configured for floating in a body of water, wherein the container comprises
    an impermeable wall (4) and an impermeable bottom (5) such that raising and lowering of the container relative to the mooring element is accomplished solely by controlling the amount of water in the container;
    the container (1; 1') is provided with one or more guiding structures (10) and the mooring element (2; 2') is provided with one or more guide elements (13),
    the one or more guide elements (13) being configured to fit an outside shape of the one or more guiding structures (10) such that the container (1) and the mooring element (2) can move freely with respect to each other in directions that coincide with a central axis ($C_L$) of the container; and
    a water intake system that includes
        an intake tubular (70) connected to and supported by the mooring element (2') and fluidly connected to an intake pump system inside the mooring element (2'), the intake tubular (70) extending to a depth in the body of water corresponding to a lower end of the container (1') when the latter is in a lowered position;
        a flexible conduit (72) supported by the mooring element (2') and extending into the body of water along a length of the container (1'), the flexible conduit (72) being fluidly connected to the intake pump system; and
        a tubular (73) connected to the flexible conduit (72) and extending along the impermeable wall (4), the tubular (73) being fluidly connected to a plurality of outlets (74), each of which extends through the impermeable wall (4) and into the container (1').

2. The floating plant of claim 1, wherein the one or more guiding structures (10) comprise elongated elements (10) extending between a bottom end (17) of the container and an upper end (18) of the container.

3. The floating plant of claim 1, wherein the one or more guiding structures (10) comprise buoyancy means.

4. The floating plant of claim 1, further comprising buoyancy means.

5. The floating plant of claim 1, wherein the one or more guiding structures (10) are arranged on the container outer side and arranged parallel with the container central axis ($C_L$).

6. The floating plant of claim 1, wherein the container (1) is cylinder-shaped and the one or more guiding structures (10) are arranged symmetrically in relation to the container cylinder shape.

7. The floating plant of claim 1, wherein the one or more guiding structures (10) are placed symmetrically about the container circumference, with the same angular distance between two adjacent guiding structures.

8. The floating plant of claim 1, wherein the one or more guide elements (13) are placed in the mooring element with the same angular distance between two adjacent guide elements (13).

9. The floating plant of claim 1, wherein the container (1; 1') has an upper opening (3).

10. The floating plant of claim 9, wherein the bottom (5) is funnel-shaped and at least one evacuation hose (6) is connected to a lower opening in the bottom.

11. The floating plant of claim 1, wherein the mooring element (2; 2') comprises mooring means (11) for mooring to a seabed, and one or more buoyancy chambers (16), whereby the mooring element may float in a water surface (S).

12. The floating plant of claim 1, wherein the mooring element (2) comprises two or more sections (2a, 2b) configured to be mounted around the container when the container and the two or more sections are floating in the water.

13. The floating plant of claim 1, wherein the container (1') comprises a support member (41) for abutment against at least a portion of the mooring element (2').

14. The floating plant of claim 13, wherein the support member (41) comprises a circumferential ledge arranged in an upper region of the container.

15. The floating plant of claim 1, wherein the plant is a plant for breeding and/or containing fish or other marine organisms.

16. A method of installing the floating plant according to claim 3 at an installation site, the method comprising:
 a) transporting the container (1; 1') to the installation site by floating the container in the water and stabilizing the container by means of buoyancy means;
 b) transporting the mooring element (2; 2') to the installation site, either in one piece or in several parts (2a, 2b); and
 c) mounting the mooring element (2; 2') such that the mooring element surrounds a portion of the container.

17. A method of raising and lowering a container (1; 1') in a body of water, relative to a mooring element (2; 2'), in the floating plant according to claim 1, characterized by controlling the amount of water in the container.

* * * * *